US007335342B2

(12) United States Patent
Jasra et al.

(10) Patent No.: US 7,335,342 B2
(45) Date of Patent: *Feb. 26, 2008

(54) PROCESS FOR THE PREPARATION OF SODIUM SILICATE FROM KIMBERLITE TAILING

(75) Inventors: Raksh Vir Jasra, Gujarat (IN); Hari Chand Bajaj, Gujarat (IN); Rajesh Shantilal Somani, Gujarat (IN); Haresh Mahipatlal Mody, Gujarat (IN); Jatin Rameshchandra Chunawala, Gujarat (IN); Devendra Lalijibhai Ghelani, Gujarat (IN); Hemal Narendrakumar Ranpara, Gujarat (IN); Dipti Jivanbhai Barochiya, Gujarat (IN); Suresh Chandra, Hyderabad (IN); Maharaj Kishan Dhar, Hyderabad (IN); C. Kesava Rao, Hyderabad (IN); Kamlesh Kumar, Hyderabad (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 11/375,687

(22) Filed: Mar. 14, 2006

(65) Prior Publication Data

US 2007/0104634 A1 May 10, 2007

(30) Foreign Application Priority Data

Nov. 10, 2005 (IN) ............................... 3012/2005

(51) Int. Cl.
*C01B 33/22* (2006.01)
*C01B 33/12* (2006.01)
*C01B 33/142* (2006.01)
*C01B 33/143* (2006.01)

(52) U.S. Cl. .................. 423/332; 106/481; 106/482; 106/483; 106/484; 106/492; 423/327.1; 423/331; 423/333; 423/334; 423/335; 423/339

(58) Field of Classification Search ............... 106/481, 106/482, 483, 484, 492; 423/335, 339, 327.1, 423/331, 333, 334, 332

See application file for complete search history.

(56) References Cited

U.S. PATENT DOCUMENTS

| 4,243,428 | A | * | 1/1981 | Donnet et al. | ............... | 106/492 |
| 4,495,167 | A | * | 1/1985 | Nauroth et al. | ............. | 423/339 |
| 5,034,207 | A | * | 7/1991 | Kerner et al. | ............... | 423/339 |
| 5,094,829 | A | * | 3/1992 | Krivak et al. | ............... | 423/339 |
| 5,123,964 | A | * | 6/1992 | Kerner et al. | .......... | 106/287.34 |
| 5,342,598 | A | * | 8/1994 | Persello | ..................... | 423/339 |
| 5,851,502 | A | * | 12/1998 | Turk et al. | .................. | 423/335 |
| 6,180,076 | B1 | * | 1/2001 | Uhrlandt et al. | ............ | 423/335 |
| 6,214,912 | B1 | * | 4/2001 | Chevallier et al. | .......... | 524/269 |
| 6,468,493 | B1 | * | 10/2002 | Chevallier et al. | .......... | 423/339 |
| 6,702,888 | B2 | * | 3/2004 | Bomal et al. | ................. | 106/492 |
| 6,800,267 | B2 | * | 10/2004 | Schubert et al. | ............. | 423/335 |
| 7,037,476 | B1 | * | 5/2006 | Jasra et al. | ................. | 423/339 |
| 2003/0118500 | A1 | * | 6/2003 | Chevallier et al. | .......... | 423/339 |
| 2006/0140853 | A1 | * | 6/2006 | Jasra et al. | ................. | 423/700 |

* cited by examiner

*Primary Examiner*—Anthony J. Green
(74) *Attorney, Agent, or Firm*—Ladas & Parry

(57) ABSTRACT

In the present invention a process for the preparation of sodium silicate from Kimberlite tailing generated as solid waste during diamond mining is disclosed. The process comprises, reacting Kimberlite tailing with mineral acid to remove acid soluble impurities followed by digesting acid treated Kimberlite tailing with alkali solution in a open or closed system to obtain sodium silicate useful for commercial applications.

11 Claims, No Drawings

PROCESS FOR THE PREPARATION OF SODIUM SILICATE FROM KIMBERLITE TAILING

FIELD OF THE INVENTION

Around four million tones of soluble silicates are produced annually all over the world that finds major applications in the detergent, pigment, catalyst and silica gel producing industry. These silicates are also used in adhesives, cement & building materials as well as pulp and paper industry. Soluble silicates are also used for general purposes cleaning like water cleaning, plant cleaning in brewing, dairying, food processing and metal processing industries. In foundry industry, silicates are used as a binder for the production of the sand cores and molds from which castings can be produced. These also find application for binding insulating materials such as vermiculite, perlite and many minerals and ores, sealing porous surfaces such as asbestos and fibrous materials.

Alkali silicates are a family of chemicals with a wide range of physical and chemical properties. These are mostly prepared by fusing sodium or potassium carbonate with sand at greater than 1000° C. or digesting sand with sodium or potassium hydroxide solution and pressure. The characteristics of alkali silicates permit their use in a variety of applications such as: welding rods, soaps, detergents, hard-surface cleaners, coating materials, and electronics.

Sodium silicate, in particular, is used for the manufacture of specialty inorganic materials namely precipitated silica, silica sol/colloidal silica and silica gel, calcium and aluminum silicates, zinc and titanium silicates, magnesium trisilicate, zeolites etc. Sodium silicate is also used in ore flotation, canal lining and in consolidation of earth.

Kimberlite tailing is produced as a huge solid waste during diamond mining. In a country like India from its Panna diamond mines, typically around 100 tones of Kimberlite is generated per 10 carat of diamond mined. Around 3-4 million tones of Kimberlite is already accumulated during previous diamond mining in India. With an estimated life of 20 years for the Panna mines, huge quantity of Kimberlite waste is likely to be available in the country. Considering this problem on the global scale as countries like South Africa and Canada are also involved in diamond mining, the quantity of Kimberlite generated is of a serious concern. Therefore, it is pertinent to look for technical solutions to gainfully utilize Kimberlite accumulated during diamond mining. Typical chemical composition of Kimberlite is as follows:

$SiO_2$ 30-32%, $Al_2O_3$ 2-5%, $TiO_2$ 5-8% CaO 8-10%, Mgo 20-24%, $Fe_2O_3$ 5-11%, loss on ignition (LOI) 15%.

Kimberlite being rich in magnesia and silica, there is an opportunity to develop silica and magnesium based products from this materials. Therefore, efforts were made to prepare value-added product like Sodium silicate after enrichment of silica content followed by chemical treatment. The value-addition of Kimberlite will not only make diamond mining more economical but will make it environment friendly process also.

BACKGROUND OF THE INVENTION

U.S. Pat. No. 2,219,646 (1940) assigned to Beecher and Mich have disclosed a process for the preparation of sodium silicate by dry fusion of silica with sodium hydroxide at temperature below the fusion or melting point of sodium hydroxide and about 2 to 4% soda ash is added to the reaction mixture. The source of silica could be silica sand, quartz, volcanic ash, silica flour etc. The drawback of the process is high temperature fusion of silica with sodium hydroxide and thus process becomes energy intensive and uneconomical.

U.S. Pat. No. 2,829,030 (1958) assigned to Habernickel wherein the process for producing alkali metal silicates having $SiO_2/Na_2O$ mole ratio 2.74 to 3.16 is reported from the mixture of sand and alkali chlorides with about 2 to 4% other alkali metal salts like sodium carbonate, sodium bicarbonate, potassium carbonate and bicarbonate or mixture of them under the action of steam. The process involves the sintering step in which mixture of silica and alkali metal chloride is ground and then sintered at 780° C. to 840° C. and then cooled before steam treatment at 1150° C. to 1250° C. This process replaces conventionally used alkali carbonates and sulfates with cheaper alkali chlorides. However, the process is highly energy intensive as it is carried out at a high reaction temperature of 1150-1250° C. for 2-6 hours and involves pretreatment of sintering of the reaction mixture.

U.S. Pat. No. 2,988,423 (1961) assigned to McDaniel has described a process for the preparation of sodium silicate having $SiO_2/Na_2O$ mole ratio in the range of 1.0 to 2.8 by reacting silica sand and aqueous solution of sodium carbonate at 155° C. to 217° C. under the pressure of 65 to 300 pound per square inch for about 20 hours or more. The drawbacks of the invention are the mole ratio of the sodium silicate prepared is comparatively low, high reaction pressure and temperature and very long reaction time make process uneconomical.

U.S. Pat. No. 3,984,526 (1976) assigned to Haase, et al. have disclosed a process for the preparation of alkali metal polysilicate solution having an $SiO_2$:alkali metal oxide mole ratio of 2.5-5.5:1 and a silica content of 16-23% by weight which comprises contacting a tetraalkoxysilane of the formula $Si(OR)_4$ wherein each R is independently a straight or branched-chain alkyl group of 1 to 3 carbon atoms with an aqueous alkali metal hydroxide solution at a temperature between room temperature and the boiling point of the reaction mixture and at a temperature up to 100° C., distilling over alcohol formed by the reaction of the silane with the alkali metal hydroxide. The drawback of the process is the source of silica is tetraalkoxysilane which makes process uneconomical.

U.S. Pat. No. 4,029,736 (1977) assigned to Melkonian, has disclosed a process for the preparation of water glass using perlite as a source of silica by treating the same with an alkaline solution having a concentration of 40-140 g/l taken in an amount which brings the ratio of the liquid and solid phases to (0.7-1.5): 1 and then separating by filtration the water glass, obtained in the process of heat treatment, from the residue formed. The drawback of the process is reaction of the perlite with alkali metal hydroxide at 130° C. to 150° C. under autogenous pressure.

U.S. Pat. No. 4,336,235 (1982) assigned to Deabriges Jean comprises a process for the manufacture of sodium silicate solution in a continuous manner from a silicon dioxide-containing material. This process includes continuous addition of a stream of said silicon dioxide-containing material and sodium hydroxide-sodium carbonate solution to a reaction zone at a temperature 225-245° C. and pressure 27-32 bar and for a time sufficient to form a sodium silicate solution, and recovering said sodium silicate solution from the reaction zone. In this process the stream of NaOH—$Na_2CO_3$ is pre-heated at temperature 250-280° C. in a nickel plated heat exchanger. This requires high cost equipment and operating condition shows that utility cost required is comparatively high which increases the production cost.

U.S. Pat. No. 4,520,001 (1985) assigned to Metzger, et al. have disclosed a process for the preparation of clear solution of alkali metal silicate having an $SiO_2$/alkali metal oxide weight ratio of 2.5 or less which comprises passing an aqueous solution of an alkali metal hydroxide through a bed of crystallized silica having an average particle size of between about 0.1 mm and 2 mm formed in the bottom of a vertical tubular reactor without mechanical agitation, said silica and alkali metal hydroxide being fed from the top of the reactor, and recovering the resulting clear solution of alkali metal silicate from the bottom of the reactor. The reaction temperature was kept between 150° C. and 240° C. The drawback of the process is the $SiO_2$/alkali metal oxide weight ratio is 2.5 or less. High $SiO_2$/alkali ratio silicate can not be obtained and minimum 150° C. reaction temperature is required.

U.S. Pat. No. 4,676,953 (1987) assigned to Jeromin, et al. have described a process for continuous production of sodium silicate having mole ratio $SiO_2/Na_2O$ 1-2.8:1 by fusing sand in aqueous sodium hydroxide solution at 150-300° C. and 5-40 bar pressure. The drawback of the process is high reaction temperature under high pressure which makes process uneconomical.

U.S. Pat. No. 4,770,866 (1988) assigned to Christophli-emk, et al. have disclosed the process of producing sodium silicate by melting quartz sand and soda together at 1,400° C. to 1,500° C. in a suitable furnace with evolution of $CO_2$. The melt that solidifies upon cooling in the form of a glass lump is then dissolved in water in another process step carried out under pressure at elevated temperature. The solution thus obtained is optionally filtered, depending upon the quality requirements. However, this process consumes very high amount of energy because of very high process temperature.

U.S. Pat. No. 5,000,933 (1991) assigned to Novotny, et al. has disclosed a process for the preparation of sodium silicate having high SiO2/Na2O molar ratio by reaction of a silicon dioxide source with aqueous sodium hydroxide solutions, or with aqueous sodium silicate solution using silicon dioxide source that contains sufficient fraction of cristobalite phase or by conditioning other crystalline forms or by conditioning other crystalline forms of silicon dioxide by heating at or above 1100° C., but below the melting point of silica, before the hydrothermal treatment. The reaction is carried out in a closed pressure reactor at temperatures of 150° C. to 300° C. and under saturated steam pressures corresponding to those temperatures. The drawback of this process is requirement of sufficient amount of cristobalite phase of $SiO_2$ in the silica source and if not the silica source is required to be treated at very high temperature before hydrothermal reaction with sodium hydroxide solution. Another drawback of the process is the hydrothermal reaction is carried out in the range of 150° C. to 300° C. under autogenous pressure.

According to the above prior art, sodium silicate is prepared using quartz sand, cristobalite, perlite etc. and sodium carbonate or sodium hydroxide. Process known in the prior art for the preparation of sodium silicates are either energy intensive or operating conditions are such that utility cost is very high. Nothing is reported in published or patented literature wherein Kimberlite tailing has been used as a source of silica for the preparation of sodium silicate and other value added silica based products.

DISCLOSURE OF THE INVENTION

The main object of the present invention is to use Kimberlite tailings as a source of silica for the preparation of sodium silicate.

Another object of the present invention is to prepare sodium silicate employing an energy efficient process which obviates the drawbacks as detailed above.

Yet another object of the present invention is to provide a process for enabling maximum recovery of silica from Kimberlite tailings generated during diamond mining.

Yet another object of the present invention is to provide a process for preparing sodium silicate with different $SiO_2/Na_2O$ mole ratio suitable for various commercial applications.

Yet another object of the present invention is to provide a process wherein Kimberlite tailings are substantially enriched in silica content for its use as silica source.

SUMMARY OF THE INVENTION

A known weight of Kimberlite tailing is added to 18% wt./Vol. of hydrochloric acid previously taken in a glass round bottom flask, keeping solid to liquid ratio 1:4 with continuous stirring at boiling temperature under refluxing conditions. After refluxing for 3 to 5 hours, the slurry is filtered and wet cake is washed with tap water till free from acid. For the preparation of sodium silicate, acid treated Kimberlite tailing thus obtained was digested with 8 to 10 weight percent NaOH solution keeping solid to liquid ratio as 1:4. The required quantity of sodium hydroxide is dissolved in requisite volume of water previously taken in a stainless steel jacketed reactor. To this alkali solution, required weight of acid treated Kimberlite was added slowly under stirring in order to prepare homogenous slurry. Reaction temperature was achieved by means of passing steam through the jacket of the reactor. After attaining the temperature, the digestion was continued for a specific time under constant stirring. After completion of the reaction, slurry was filtered and residue was washed with tap water to recover silica and alkali. Filtrate and wash water were analyzed for its $SiO_2$ and $Na_2O$ content.

DESCRIPTION OF THE INVENTION

Accordingly, a process for the maximum recovery of silica from Kimberlite tailings which comprises:
1) treating Kimberlite tailings with 1 to 5 N mineral acid of acid for a period ranging between 3-5 h at a temperature ranging between 95-100° C. to obtain silica enriched material as a solid
2) digesting silica enriched solid with alkali solution of strength ranging between 8-10% in a closed system at 95-190° C. or in open system at boiling temperature for a period ranging between 3-4 h to obtain sodium silicate of required properties.

Accordingly, the present invention provides a process for the maximum recovery of silica from Kimberlite tailings wherein initially Kimberlite tailings is treated with 1 to 5 N mineral acid such as hydrochloric acid for a period of 3 to 5 h at 95-100° C. to remove acid soluble impurities as filtrate and to obtain silica rich material as solids, following which silica rich solid is digested with 8 to 10% alkali solution, namely sodium hydroxide, in a closed system at 95-190° C. or in open system at boiling temperature for 3 to 4 hours to prepare sodium silicate of required properties useful for commercial applications.

The Raw Kimberlite typically contains about 32-35% silica. In order to recover silica and to convert this silica into value added product, it is essential to increase the silica content of the Kimberlite tailings by means of its upgradation. Enrichment of silica in the Kimberlite is necessary for its effective use as source of silica to produce sodium silicate. Kimberlite tailing was treated with hydrochloric acid at boiling temperature under refluxing conditions and continuous stirring to remove the acid soluble impurities. The silica content in the acid treated Kimberlite tailing increases up to 72-78%. Kimberlite tailing enriched in silica is used for the preparation of storage stable sodium silicate.

In an embodiment of the present invention, Kimberlite tailing is ground using Pin mill and passed through 60 mesh sieve.

In an another embodiment of the present invention, the −60 mesh fraction of Kimberlite tailing is treated with mineral acid such as hydrochloric acid at boiling temperature under refluxing conditions with continuous stirring to remove the acid soluble impurities present in the Kimberlite tailing as a filtrate.

In yet another embodiment of the present invention, the acid treated Kimberlite tailing which is rich in silica content is digested with an alkali such as sodium hydroxide solution at 105° C. under stirring for a fixed period of 3 to 5 h.

In yet another embodiment of the present invention the alkali digested Kimberlite tailing is filtered using vacuum filtration system.

In yet another embodiment, 25% loss of solid was observed during the acid treatment of the Kimberlite tailing as soluble metallic salts in the filtrate which can be further used for obtaining value added products like $Mg(OH)_2$, $MgO$ and $Fe_2O_3$.

In yet another embodiment, 75-85% silica recovery was obtained from the acid treated Kimberlite tailing at the boiling temperature.

In yet another embodiment, total reduction of solids was found to be 82-87%, which could remarkably reduce the quantity of solid waste generated during diamond mining. Moreover, Kimberlite tailing—the solid waste generated during diamond mining—is converted to silica rich raw material for producing sodium silicate.

The digestion of acid treated-silica rich Kimberlite with sodium hydroxide solution at relatively moderate temperature and atmospheric pressure gives sodium silicate essentially because the silica present in Kimberlite is an active silica and not in highly thermodynamically stable form such as Quartz. The sodium silicate obtained is analyzed as per the following methods.

Analysis of Sodium Silicate

1. Preparation of Sodium Silicate Sample:

Weigh accurately sodium silicate (~10.0 g) in pre-weighed sample bottle, transfer the sample quantitatively in 250 ml volumetric flask, wash the sample bottle thoroughly with distilled water and transfer the same in volumetric flask, wash the bottle repeatedly and transfer the wash water in the volumetric flask quantitatively. Shake well the solution and make up the volume to the mark with distilled water, mix it thoroughly by shaking the flask and label it as stock solution.

2. Analysis of $SiO_2$ in Sodium Silicate:

Pipette out 50 ml sodium silicate solution from the stock solution by using 50 ml pipette and transfer the solution in a clean beaker containing 50.0 ml 1:1 HCl solution, mix well the solution with glass rod. Evaporate the contents of the beaker to complete dryness on the water bath, crush all lumps with a glass rod. Add 50.0 ml 1:1 HCl, mix the solid lumps and acid with the help of glass rod, again evaporate the acid solution to dryness. Repeat the procedure thrice. After complete evaporation, when powder appears to be dry, place the beaker in an air oven at 100-110° C. for 1 h in order to dehydrate the silica. Moisten the residue with 5 ml of 1:1 HCl, and bring the acid into contact with solid with the aid of stirring rod. Add 75 ml of distilled water rinse down the sides of the beaker and heat on a water bath for 10-20 minute. Filter off the separated silica on a Watchman-42 filter paper, wash the precipitate first with warm dilute HCl and then with hot distilled water until free from chloride, pour the filtrate and washings in to original beaker evaporate to dryness on the water bath and heat in on air oven at 100-110° C. for 1 hrs. Moisten the residue with 5 ml 1:1 HCl, add 75 ml distilled water, warm to extract soluble salts, and filter through a fresh but smaller filter paper wash with warm dilute HCl and finally with a little hot distilled water. [The mother liquor+washing are to be used for the analysis of other elements.] Fold the moist filter papers and place them in a pre-weighted platinum crucible, dry the paper, char the paper, and burn off the carbon over a low flame take care that none of the fine powder is blown away. After burning the carbon completely cover the crucible and heat for an hour at the full temperature (1000±25° C.). Allow to cool in a desiccator, and weigh. Repeat the ignition until the weight is constant, record the weight ($W_2$). Moisten the residue with 1.0 ml distilled water; add 2 to 3 drops of concentrated $H_2SO_4$ (AR grade) and about 5 ml of purest available (AR grade) HF. Place the crucible on water bath and evaporate the HF in a fume chamber with small flame or on hot plate until the acid is completely expelled, the liquid should not be boiled. Then increase the heat to volatilize the $H_2SO_4$ and finally in muffle furnace at 1000° C. for 1 hrs. Allow to cool the crucible in a desiccator and weigh. Re-heat to constant weight ($W_3$). The loss in weight represents the weight of the pure silica ($SiO_2$). Find % of pure silica ($SiO_2$) using the following equation.

$$\% \ SiO_2 = [(W_2 - W_3)/W_1] \times 1000$$

Where, $W_1$=weight of sodium silicate taken for the preparation of stock solution.

3. Analysis of $Na_2O$ in Sodium silicate sample:

Pipette out 25 ml solution from the stock solution with 25 ml pipette and dilute it to ~100 ml with distilled water in 250 ml conical flask, add 2-3 drops of methyl orange indicator, titrate it against standard HCl (0.1 N) till color change from yellow to orange, note the burette reading and find % $Na_2O$ using the following equation.

$$\% \ Na_2O = N \times BR \times 31/W_1$$

Where N=Normality of acid; BR=Burette Reading; $W_1$=Weight of sodium silicate taken for the preparation of stock solution.

The following examples are given by way of illustration and therefore should not be constructed to limit the scope of the present invention.

EXAMPLE 1

15 g of Kimberlite tailing is taken in a Teflon container with 5 g of sodium hydroxide. To this 20 g of water is added. Then the container was closed tightly and kept in air oven for 5 h at 150° C. After completion of reaction, slurry was centrifuged and the filtrate was analyzed for $SiO_2$ and $Na_2O$.

The SiO$_2$/Na$_2$O mole ratio in sodium silicate was found to be 1.81. The stability of the sodium silicate produced is found to be poor. Hydrolysis of sodium silicate to silica particles was observed during storing of the product at room temperature within 10-15 days for above product due to presence of impurity in the sodium silicate.

EXAMPLES 2

100 g of alkali was dissolved in 2 liters of tap water and taken in to a glass round bottom flask. To this, 500 g of Kimberlite tailing was added under continuous stirring to prepare homogenous slurry and heated for 5 h at 95-100° C. After completion of reaction, slurry was filtered with vacuum filtration system and filtrate was analyzed for SiO$_2$ and Na$_2$O. The SiO$_2$/Na$_2$O mole ratio in sodium silicate was 2.72. Hydrolysis of sodium silicate to silica particles was observed during storing of the product at room temperature within 10-15 days for this product due to presence of some impurity in the sodium silicate.

EXAMPLE 3

70 g of Kimberlite tailing was treated with 15% hydrochloric acid at 95-100° C. under continuous stirring keeping solid to liquid ratio 1:10 for 5 h. Then the slurry was filtered and washed with tap water till wet cake becomes acid free. After completion of washing, it was dried in oven at 110° C. and dry solid is used for sodium silicate preparation. For the preparation of sodium silicate, 16 g of alkali was dissolved in 200 ml of water and taken in to stainless steel autoclave. To this, 50 g of acid treated Kimberlite was added under continuous stirring. Then the reactor was closed and heated for 5 h at 150° C. After completion of reaction, slurry was filtered under vacuum and filtrate was analyzed for SiO$_2$ and Na$_2$O. The SiO$_2$/Na$_2$O mole ratio in sodium silicate was found to be 2.99. Recovery of silica in sodium silicate was 78%. Sodium silicate prepared from acid treated Kimberlite was found to be stable and no hydrolysis of silica was observed on prolong storage. Composition in weight percent of this Sodium silicate was found as follows:

SiO$_2$=13.40%, and Na$_2$O=4.25%.

EXAMPLE 4

140 g of Kimberlite was treated with 15% hydrochloric acid at 95-100° C. under continuous stirring keeping solid to liquid ratio 1:10 for 5 h, then the slurry was filtered and washed with tap water till wet solid cake becomes acid free. After completion of washing it was dried in an oven at 110° C. and the dry solid is used for the preparation of sodium silicate. 32 g of alkali was dissolved in 300 ml of water and taken in to stainless steel autoclave. To this, 100 g of acid treated Kimberlite was added under continuous stirring. The reactor was closed and heated for 5 h at 150° C. After completion of reaction, the reaction slurry was filtered using Buckner funnel under vacuum and filtrate was analyzed for SiO$_2$ and Na$_2$O. The SiO$_2$/Na$_2$O mole ratio in Sodium silicate was found to be 3.36. Recovery of silica in sodium silicate was found to be 90%. Sodium silicate composition in weight percent was SiO$_2$=21.42%, and Na$_2$O=7.18%.

EXAMPLE 5

200 g of Kimberlite was treated with 15% hydrochloric acid at 95-100° C. under continuous stirring keeping solid to liquid ratio 1:4 for 3.5 h, then the slurry was filtered and washed with tap water till wet solid cake becomes iron free. Then the slurry was dried in an oven at 110° C. and dry solid is used for preparation of sodium silicate. 40 g of alkali dissolved in 280 ml of water was taken in a stainless steel autoclave. To this, 150 g of acid treated Kimberlite tailing was added under continuous stirring to prepare homogenous slurry. Then the reactor was closed and heated for 5 h at 170° C. After completion of reaction, slurry was filtered with vacuum filter and filtrate was analyzed for SiO$_2$ and Na$_2$O. The SiO$_2$/Na$_2$O mole ratio in sodium silicate was found to be 3.28. Recovery of silica in sodium silicate was found to be 30%. Reduction in silica recovery may be due to lower solid to liquid ratio and increase in the viscosity of the reaction mixture. Sodium silicate composition in weight percent is given below:

| Component | % by Wt. |
| --- | --- |
| SiO$_2$ | 16.55 |
| Na$_2$O | 5.22 |
| R$_2$O$_3$ | 0.082 |
| CaO + MgO | 0.044 |

EXAMPLE 6

135 g of Kimberlite tailing was treated with hydrochloric acid having concentration of 15% by wt. at 95-100° C. under continuous stirring keeping solid to liquid ratio 1:4 for 3.5 h, then the slurry was filtered and washed with tap water till wet solid cake becomes acid free. Then it was dried in an oven at 110° C. and dry solid is used for preparation of sodium silicate. For the preparation of sodium silicate 31.2 g of alkali dissolved in 400 g of water was taken in to stainless steel autoclave. To this 100 g of acid treated Kimberlite was added under continuous stirring to prepare homogenous slurry. Then the reactor was heated for 2 h at boiling temperature. After completion of reaction, the slurry was filtered with vacuum filter and filtrate was analyzed for SiO$_2$ and Na$_2$O. The SiO$_2$/Na$_2$O mole ratio in sodium silicate was found to be 3.30. Recovery of silica in sodium silicate was found to be 81%. Analysis of the product is given below.

| Component | % by Wt. |
| --- | --- |
| SiO$_2$ | 15.18 |
| Na$_2$O | 4.20 |
| R$_2$O$_3$ | 0.087 |
| CaO + MgO | 0.017 |

EXAMPLE 7

2.7 kg of Kimberlite tailing was treated with 15% hydrochloric acid at 95-100° C. under continuous stirring keeping solid to liquid ratio 1:4 for 3 h, then the slurry was filtered and washed with tap water till wet solid cake becomes acid free. The cake was dried in oven at 110° C. and is used for preparation of sodium silicate. For the preparation of sodium silicate 0.64 kg of an alkali was dissolved in 8 liters of water and taken in to stainless steel autoclave. To this 2 kg of acid treated Kimberlite was added under continuous stirring to prepare homogenous slurry. Then the reactor was heated for 3.5 h at boiling temperature. After completion of reaction, the slurry was filtered with vacuum filter and filtrate was analyzed for $SiO_2$ and $Na_2O$. The $SiO_2/Na_2O$ mole ratio was 3.25. Recovery of silica as sodium silicate was found to be 75%. Analysis of sodium silicate obtained is given below

| Component | % by Wt. |
|---|---|
| $SiO_2$ | 13.73 |
| $Na_2O$ | 4.36 |
| $R_2O_3$ | 0.047 |
| $CaO + MgO$ | 0.017 |

EXAMPLE 8

23 kg of Kimberlite tailing was treated with 15% hydrochloric acid at 95-100° C. under continuous stirring keeping solid to liquid ratio 1:4 for 3 h then the slurry was filtered and washed with tap water till wet solid cake becomes acid free. Then it was dried in oven at 110° C. and dry solid is used for the preparation of sodium silicate. 5.44 kg of alkali dissolved in 68 liters of water was taken in to stainless steel reactor. To this 17 kg of acid treated Kimberlite was added under continuous stirring to prepare homogenous slurry. Then the reactor was heated for 3.5 h at boiling temperature. After completion of reaction slurry was filtered with vacuum filter and filtrate was analyzed for $SiO_2$ and $Na_2O$. The $SiO_2/Na_2O$ mole ratio in sodium silicate was found to be 3.16. Recovery of silica in sodium silicate was found to be 73%.

Analysis of sodium silicate obtained is given below.

| Component | % by Wt. |
|---|---|
| $SiO_2$ | 14.63 |
| $Na_2O$ | 4.77 |
| $R_2O_3$ | 0.052 |
| $CaO + MgO$ | 0.088 |

EXAMPLE 9

Sodium silicate was prepared following the procedure as described in Example-8 is having a dark brownish color probably due to presence of some organic compounds. This can be used as such for the preparation of precipitated silica and Zeolite-A. However, to improve the quality and color of sodium silicate, decolourization of sodium silicate was done using activated carbon as decolorizing agent. 1 kg of sodium silicate was taken in the stainless steel reactor and it was heated to 75-80° C. for 2 h after adding 34% by wt. of commercially available activated charcoal under continuous stirring and filtered. After the carbon treatment sodium silicate obtained was colorless.

The process of preparing sodium silicate in the present invention is novel in the sense that it makes use of the raw material considered to be solid waste and has not been reported to be used for the said process before so far. From technical view point, the process is novel as it involves relatively low temperature (95-105° C.) and atmospheric pressure conditions for the preparation of sodium silicate. Quartz or silica sand used in conventional processes for the production of sodium silicate requires high temperature (~1100° C.) reaction with sodium carbonate as quartz is crystalline material and thermodynamically stable form of $SiO_2$. However, Kimberlite is having serpentine mineral which after acid treatment converted to silica in amorphous form and is comparatively active and a better starting material for producing sodium silicate. The process developed is useful for the value addition of the waste material produced during diamond mining. This will make diamond mining both economically attractive as well as eco-friendly. Furthermore, this will lessen the requirement of naturally occurring good quality sand used for producing sodium silicate and thus contribute towards preserving the ecological balance.

We claim:

1. A process for the recovery of sodium silicate from Kimberlite tailings which comprises:
    (i) treating Kimberlite tailings with 2 to 15% mineral acid for a time duration ranging between 3-5 h at a temperature ranging between 95-100° C. to obtain silica enriched material as a solid and
    (ii) digesting the silica enriched solid with an alkali solution of strength ranging between 8-10% in a closed system at 95-190° C. or in an open system at boiling temperature for a time duration ranging between 3-4 h to obtain sodium silicate.

2. A process according to claim 1, wherein the sodium silicate obtained has the following composition:

| Component | % by Wt. |
|---|---|
| $SiO_2$ | 13-16 |
| $Na_2O$ | 4-6 |
| $R_2O_3$ | 0.04-0.09 |
| $CaO + MgO$ | 0.044-0.088. |

3. A process according to claim 1, wherein the chemical composition of Kimberlite used is as follows:
    $SiO_2$: 30-32%, $Al_2O_3$: 2-5%, $TiO_2$: 5-8%, CaO: 8-10%, MgO: 20-24%, $Fe_2O_3$:

4. A process according to claim 1, wherein the Kimberlite tailings are generated during diamond mining.

5. A process according to claim 1, wherein 15% hydrochloric acid is used for treating raw Kimberlite tailings at a temperature ranging between 95-100° C. with Kimberlite to acid ratio of 1:4 for the time duration of 3 to 5 h.

6. A process according to claim 1, wherein the silica enriched material obtained in step (i) has a silica content of from 72 to 78%.

7. A process according to claim 1, wherein acid treated silica rich solid obtained in step (i) is digested with sodium hydroxide at a temperature ranging between 95-105° C.

8. A process according to claim 1, wherein the sodium silicate produced has a $SiO_2/Na_2O$ ratio in the range between 2.3 to 3.3.

9. A process according to claim 1, wherein the sodium silicate produced has a $SiO_2/Na_2O$ ratio in the range between 2.3 to 3.3 and is further purified by treatment with activated carbon.

10. A process according to claim 9, wherein 3-4% by wt. activated carbon is used for the purification of sodium silicate.

11. A process according to claim 1, wherein the sodium silicate product recovered from the Kimberlite tailings has a silica content of about 85%.

* * * * *

UNITED STATES PATENT AND TRADEMARK OFFICE
CERTIFICATE OF CORRECTION

PATENT NO. : 7,335,342 B2  Page 1 of 1
APPLICATION NO. : 11/375687
DATED : February 26, 2008
INVENTOR(S) : Raksh Vir Jasra et al.

It is certified that error appears in the above-identified patent and that said Letters Patent is hereby corrected as shown below:

On title page, item 75, inventor "Lalijibhai" should read -- Laljibhai -- and item 30, "3012/2005" should read -- 3012/DEL/05 --.

Signed and Sealed this

Seventeenth Day of June, 2008

JON W. DUDAS
*Director of the United States Patent and Trademark Office*